(12) United States Patent
Oshihara et al.

(10) Patent No.: US 10,573,893 B2
(45) Date of Patent: Feb. 25, 2020

(54) ELECTRODES WITH DIRECTIONALLY RESTRAINED ACTIVE MATERIALS AND METHODS OF RESTRAINT

(71) Applicant: NISSAN NORTH AMERICA, INC., Franklin, TN (US)

(72) Inventors: Kenzo Oshihara, Farmington Hills, MI (US); Xiaoguang Hao, Burnsville, MN (US)

(73) Assignee: Nissan North America, Inc., Franklin, TN (US)

( * ) Notice: Subject to any disclaimer, the term of this patent is extended or adjusted under 35 U.S.C. 154(b) by 928 days.

(21) Appl. No.: 14/977,891

(22) Filed: Dec. 22, 2015

(65) Prior Publication Data

US 2017/0179489 A1 Jun. 22, 2017

(51) Int. Cl.
| | |
|---|---|
| *H01M 4/62* | (2006.01) |
| *H01M 10/0525* | (2010.01) |
| *H01M 4/04* | (2006.01) |

(Continued)

(52) U.S. Cl.
CPC .......... *H01M 4/62* (2013.01); *H01M 4/0404* (2013.01); *H01M 4/0428* (2013.01); *H01M 4/0471* (2013.01); *H01M 4/134* (2013.01); *H01M 4/386* (2013.01); *H01M 4/625* (2013.01); *H01M 4/1395* (2013.01); *H01M 4/366* (2013.01);

(Continued)

(58) Field of Classification Search
CPC ........ H01M 4/62; H01M 4/667; H01M 4/663; H01M 4/1395; H01M 4/366; H01M 4/0404; H01M 4/0471; H01M 4/625; H01M 4/386; H01M 4/134; H01M 4/0428; H01M 10/0525; H01M 4/387

See application file for complete search history.

(56) References Cited

U.S. PATENT DOCUMENTS

| | | |
|---|---|---|
| 7,000,297 B2 | 2/2006 | Frustaci et al. |
| 7,250,233 B2 | 7/2007 | Choi et al. |

(Continued)

FOREIGN PATENT DOCUMENTS

WO 9950921 A1 10/1999

OTHER PUBLICATIONS

Zhang et al., "Three Dimensional Metal Scaffold Supported Bicontinuous Silicon Battery Anodes," 2012, Nano Letters, 12, 2778-2783. (Year: 2012).*

*Primary Examiner* — Ula C Ruddock
*Assistant Examiner* — Matthew W Van Oudenaren
(74) *Attorney, Agent, or Firm* — Young Basile Hanlon & MacFarlane, P.C.

(57) ABSTRACT

A method of making an electrode for a lithium ion battery includes providing a restricting media having a main body with opposing planar surfaces and depositing alloying particles on the opposing planar surfaces to form a restrained active particle layer. The restricting media can be a magnetic, electrochemically inactive material with an affinity for the alloying particles. The restricting media restrains expansion of the alloying particles during lithiation to a respective side of the restricting media. Electrodes include a current collector and an electrode material layer adjacent the current collector including the restricting media, the alloying particles deposited on the restricting media to form a restrained active particle layer, and a carbon material in contact with the alloying particles.

10 Claims, 5 Drawing Sheets

(51) Int. Cl.
    *H01M 4/134*    (2010.01)
    *H01M 4/38*     (2006.01)
    *H01M 4/74*     (2006.01)
    H01M 4/36     (2006.01)
    H01M 4/66     (2006.01)
    H01M 4/1395   (2010.01)

(52) U.S. Cl.
    CPC ............ *H01M 4/387* (2013.01); *H01M 4/663* (2013.01); *H01M 4/667* (2013.01); *H01M 10/0525* (2013.01)

(56) References Cited

U.S. PATENT DOCUMENTS

| | | |
|---|---|---|
| 7,553,584 B2 | 6/2009 | Chiang et al. |
| 7,972,537 B2 | 7/2011 | Meng et al. |
| 7,988,896 B2 | 8/2011 | Zhang et al. |
| 8,669,008 B2 | 3/2014 | Cho et al. |
| 8,920,978 B1 | 12/2014 | Gross et al. |
| 9,093,693 B2 | 7/2015 | Zhamu et al. |
| 2009/0061319 A1* | 3/2009 | Kim ...................... H01M 4/366 429/220 |
| 2010/0297502 A1 | 11/2010 | Zhu et al. |
| 2011/0027650 A1* | 2/2011 | Yamamoto ............ H01M 4/134 429/218.1 |
| 2011/0123866 A1 | 5/2011 | Pan et al. |
| 2012/0183856 A1 | 7/2012 | Cui et al. |
| 2013/0077515 A1 | 3/2013 | Jung et al. |
| 2014/0023920 A1 | 1/2014 | Yamazaki et al. |
| 2014/0045065 A1 | 2/2014 | Bao et al. |
| 2014/0057179 A1 | 2/2014 | Yushin et al. |
| 2015/0221929 A1 | 8/2015 | Lu |

\* cited by examiner

ELECTRODES WITH DIRECTIONALLY RESTRAINED ACTIVE MATERIALS AND METHODS OF RESTRAINT

TECHNICAL FIELD

This disclosure relates to electrodes for lithium ion batteries having directionally restrained active particles and methods of making the same.

BACKGROUND

Hybrid vehicles (HEV) and electric vehicles (EV) use chargeable-dischargeable energy storages. Secondary batteries such as lithium-ion batteries are typical energy storages for HEV and EV vehicles. Lithium-ion secondary batteries typically use carbon, such as graphite, as the anode electrode. Graphite materials are very stable and exhibit good cycle-life and durability. However, graphite material suffers from a low theoretical lithium storage capacity of only about 372 mAh/g. This low storage capacity results in poor energy density of the lithium-ion battery and low electric mileage per charge.

To increase the theoretical lithium storage capacity, silicon has been added to active materials. However, silicon active materials suffer from rapid capacity fade, poor cycle life and poor durability. One primary cause of this rapid capacity fade is the massive volume expansion of silicon (typically up to 300%) upon lithium insertion. Volume expansion of silicon causes particle cracking and pulverization. This deteriorative phenomenon escalates to the electrode level, leading to electrode delamination, loss of porosity, electrical isolation of the active material, increase in electrode thickness, rapid capacity fade and ultimate cell failure.

SUMMARY

Disclosed herein are electrodes having directionally restrained active particles and methods of making the same.

One method of making an electrode for a lithium ion battery comprises providing a restricting media having a planar main body and fixedly depositing active alloying particles along the restricting media such that the restricting media restrains expansion of the active alloying particles in at least one direction.

Another method of making an electrode for a lithium ion battery includes providing a restricting media having a main body with opposing planar surfaces and depositing alloying particles on the opposing planar surfaces to form a restrained active particle layer. The restricting media can be a magnetic, electrochemically inactive material with an affinity for the alloying particles, the restricting media restraining expansion of the alloying particles during lithiation to a respective side of the restricting media. Electrodes include a current collector and an electrode material layer adjacent the current collector including the restricting media, the alloying particles deposited on the restricting media to form a restrained active particle layer, and a carbon material in contact with the alloying particles.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Because the carbon material used in electrodes of conventional batteries, such as lithium ion batteries or sodium ion batteries, suffers from a low specific capacity, the conventional battery has poor energy density even though there is small polarization and good stability. Furthermore, batteries having electrodes of graphite or other carbon materials develop increased internal resistance over time, which decreases their ability to deliver current.

To address the poor energy density of carbon based electrodes, alternative active materials with higher energy densities are desired. Alloying particles such as silicon, tin, germanium and their oxides and alloys are non-limiting examples of materials that may be added to an electrode active material layer to improve its energy density, among other benefits.

One particular example is the use of silicon in lithium-ion batteries. Electrode materials such as silicon react with lithium via a different mechanism than graphite. Lithium forms alloys with silicon materials, which involves breaking the bonds between host atoms, causing dramatic structural changes in the process. Since the silicon does not constrain the reaction, anode materials that form alloys can have much higher specific capacity than intercalation electrode materials such as graphite. Silicon based anode active materials have potential as a replacement for the carbon material of conventional lithium-ion battery anodes due to silicon's high theoretical lithium storage capacity of 3500 to 4400 mAh/g. Such a high theoretical storage capacity could significantly enhance the energy density of the lithium-ion batteries. However, silicon active materials suffer from rapid capacity fade, poor cycle life and poor durability. One primary cause of this rapid capacity fade is the massive volume expansion of silicon (typically up to 300%) and structural changes due to lithium insertion. Volume expansion of silicon can cause particle cracking and pulverization when the silicon has no room to expand, which leads to delamination of the active material from the current collector, electrical isolation of the fractured or pulverized active material, capacity fade due to collapsed conductive pathways, and increased internal resistance over time.

Disclosed herein are electrodes having directionally restrained active particles. The isotropic expansion of the active particles is limited, thereby strengthening the electrode structure by reducing particle cracking and pulverization, delamination and electrical isolation, as non-limiting examples. The cycle durability of batteries utilizing such electrodes is improved.

Figure 1:
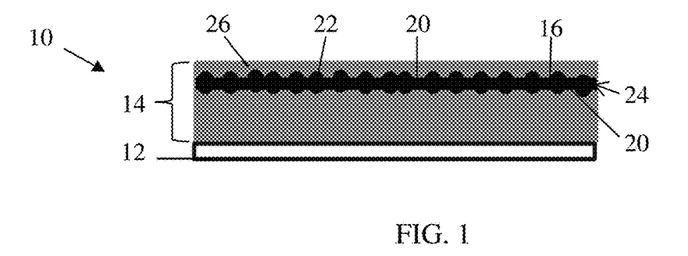
FIG. 1 is a side view of a schematic of on electrode having a restrained active particle layer as disclosed herein.

An electrode 10 for a lithium ion battery is illustrated in FIG. 1. The electrode 10 comprises a current collector 12 and an electrode material layer 14 adjacent the current collector 12. The electrode material layer 14 comprises a restricting media 16 having a main body 18 with opposing planar surfaces 20. Alloying particles 22 are deposited on the restricting media 16 to form a restrained active particle layer 24. The restricting media 16 is an electrochemically inactive material with an affinity for the alloying particles 22. The restricting media 16 can also be of a material that is harder than the alloying particles 22 used in the restrained active particle layer 24. An example of a material for the restricting media 16 is a transition metal. The restricting media 16 restrains expansion of the alloying particles 22 during lithiation. A carbon material 26 is in contact with the alloying particles 22.

The alloying particles 22 can be silicon-based or tin-based, for example. The silicon-based particles can be silicon, a silicon alloy, a silicon/germanium composite, silicon oxide and combinations thereof. The tin-based particles can be tin, tin oxide, a tin alloy and combinations thereof. Other high energy density materials known to those skilled in the art are also contemplated. As discussed above, this high capacity for lithium ions results in large volume expansions of the alloying particles 22. The carbon material 26 can include one or more of graphene, graphite, surface modified graphite, carbon nanotubes, carbon black, hard carbon, soft carbon and any other carbon materials known to those skilled in the art having the requisite electrochemical activity. Alternative to the carbon material 26, other electrode materials that provide the requisite characteristics and known to those skilled in the art can be used, such as metal alloys or conductive polymers.

Figure 2:
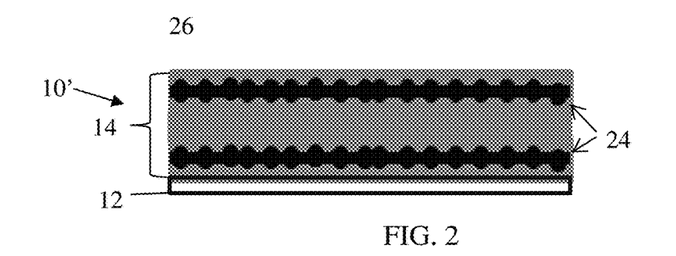
FIG. 2 is a side view of a schematic of another electrode having a plurality of restrained particle layers as disclosed herein.

The electrode 10 can have a plurality of restrained active particle layers 24. As a non-limiting example, FIG. 2 illustrates an electrode 10' with two restrained active particle layers 24.

Figure 3A:
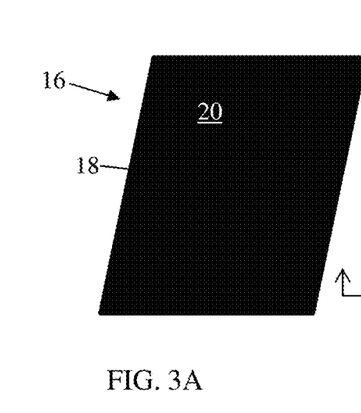
FIGS. 3A-3C are plan views of restricting medias used in the restrained active particle layers disclosed herein.
Figure 4A:
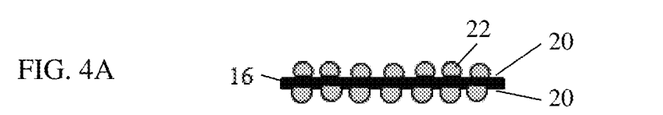
FIGS. 4A-4C are side views or cross sectional views of the restricting medias of FIGS. 3A-3C, respectively, having alloying particles.

The restricting media 16 can be of a structure that provides the restraining mechanism for the alloying particles 22. In FIG. 3A, the restricting media 16 is a plate, a solid, continuous sheet of material. The alloying particles 22 are deposited on the opposing planar surfaces 20 of the restricting media 16, as illustrated in FIG. 4A. Alternatively, the alloying particles 22 can be on only one of the opposing planar surfaces 20. The alloying particles 22 can be uniformly distributed across one or both of the opposing planar surfaces 20, or can be non-uniform. The alloying particles 22 can be of similar size along one or both of the opposing planar surfaces 20 or can be a distribution of sizes.

Figure 5A:
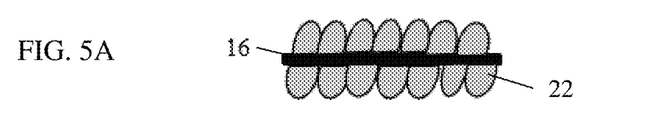
FIGS. 5A-5C illustrate the restrained active particles layers of FIGS. 4A-4C, respectively, in an expanded state due to lithiation.

As illustrated in FIG. 5A, when the alloying particles 22 expand due to lithiation, the alloying particles 22 are restrained from expansion due to their proximity with each other and the restricting media 16. The alloying particles 22 are forced to primarily expand in the direction away from the restricting media 16. The restricting media 16 can be of a magnetic material to assist in aligning the alloying particles 22 on the restricting media 16. When the magnetic material is used for the restricting media 16, the alloying particles 22 maintain contact with the restricting media 16 and expand in the available void space and into the carbon material 26. The magnetic material is-assists in production as the restricting media 16 decreases in size.

Figure 3B:
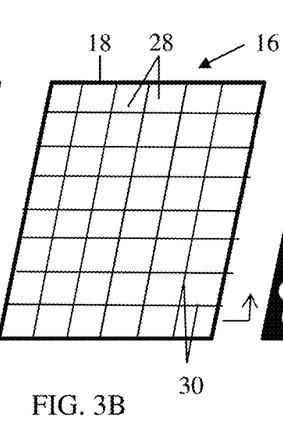
Figure 4B:
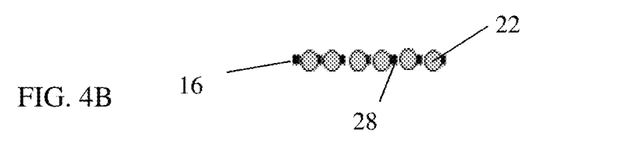

In FIG. 3B, the restricting media 16 is a mesh having spaces 28 that receive the alloying particles 22. Mesh will typically have uniformly sized spaces 28, as illustrated in FIG. 3B. However, uniformly sized spaces 28 are not necessary. As illustrated in FIG. 4B, the alloying particles 22 settle into the spaces 28, which may be of a non-spherical shape. Carbon powder can be used to fill in the voids between the alloying particles 22 and the perimeters 30 of the spaces 28 due to the difference in shapes. Alternatively, the carbon material 24 can be used to fill in the voids.

The diameter of each space 28 is larger than the diameter of the alloying particles 22 when delithiated or in a contracted state. For example, the diameter of each space 28 can be approximately 105% to 110% the diameter of the alloying particles 22. The alloying particles 22 are deposited in the spaces 28 with a binder material such that a perimeter 30 of each space 28 forms a belt around one or more of the alloying particles 22, preventing isotropic expansion of the alloying particles 22 while allowing directional expansion of the alloying particles 22 along a stacking direction of the electrode.

Figure 5B:
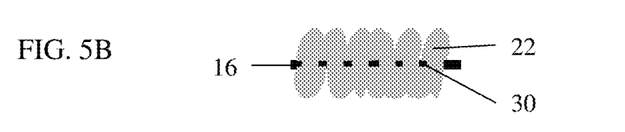

As illustrated in FIG. 5B, the alloying particles 22 are restrained from expansion due to their proximity with each other and the restricting media 16. The alloying particles 22 are forced to primarily expand in the direction away from the restricting media 16 in the stacking direction. The perimeter 30 of the spaces 28 act as a belt around the alloying particles 22, forcing the alloying particles 22 to primarily expand in the direction away from the restricting media 16.

The thickness T of the restricting media 16 is sufficient to restrain the expansion of the alloying particles 22 perpendicular to the stacking direction. For example, the thickness T of the restricting media 16 can be 25% to 60% of the diameter of the alloying particles 22.

Figure 3C:
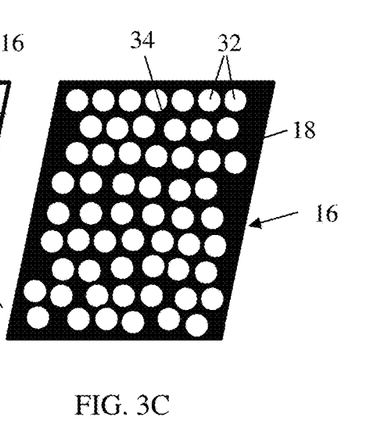

In FIG. 3C, the restricting media 16 is a plate having apertures 32 formed therein that receive the alloying particles 22. The apertures 32 can be formed in the plate of the restricting media 16 uniformly or randomly as desired or required, with uniform sizes or varying sizes. As illustrated in FIG. 5B, the alloying particles 22 settle into the apertures 32. Carbon powder can be used to fill in the voids between the alloying particles 22 and the aperture perimeters 34 if necessary. Alternatively, the carbon material 24 can be used to fill in the voids.

The diameter of each aperture 32 is slightly larger than the diameter of the alloying particles 22. For example, the diameter of each aperture 32 can be approximately 105% to 110% the diameter of the alloying particles 22. The alloying particles 22 are deposited in the apertures 32 with a binder material such that the aperture perimeter 34 forms a belt around one or more of the alloying particles 22, preventing isotropic expansion of the alloying particles 22 while allowing directional expansion of the alloying particles 22 along a stacking direction of the electrode.

Figure 5C:
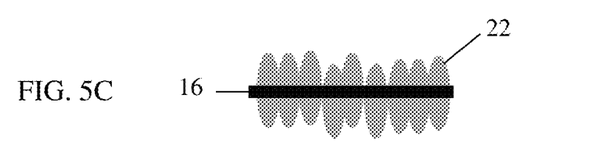

As illustrated in FIG. 5C, the alloying particles 22 are restrained from expansion due to their proximity with each other and the restricting media 16. The alloying particles 22 are forced to primarily expand in the direction away from the restricting media 16 in the stacking direction. The aperture perimeter 34 acts as a belt around the alloying particles 22, forcing the alloying particles 22 to primarily expand in the direction away from the restricting media 16.

Figure 4C:
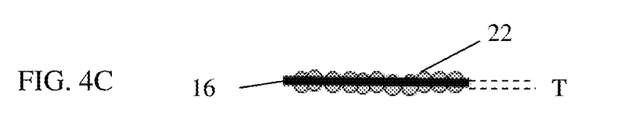

The thickness T of the restricting media 16, illustrated in FIG. 4C, is sufficient to restrain the expansion of the alloying particles 22 perpendicular to the stacking direction. For example, the thickness T of the restricting media 16 can be 25% to 60% of the diameter of the alloying particles 22.

As noted, the alloying particles 22 can have a range of size distribution, and the spaces 28 or apertures 32 of the restricting media 16 are formed in varying diameters to accommodate the range of size distribution of the alloying particles 22.

Figure 6:
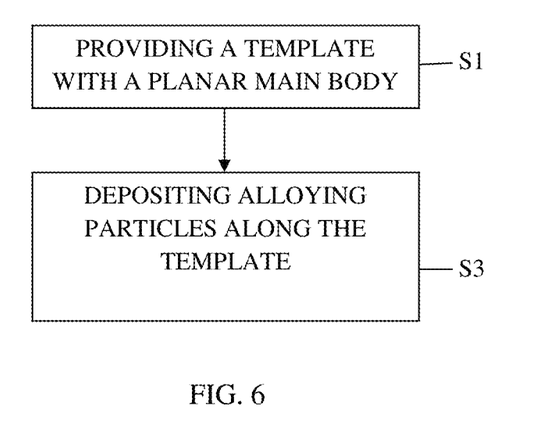
FIG. 6 is a flow diagram of a method of making electrode embodiments disclosed herein.

Also disclosed herein are methods of making the electrodes for a lithium ion battery. One such method, as shown in FIG. 6, comprises providing a restricting media 16 having a planar main body 18 in step S1 and fixedly depositing active alloying particles 22 along the restricting media 16 such that the restricting media 16 restrains expansion of the active alloying particles 22 in at least one direction in step S3.

Figure 7:
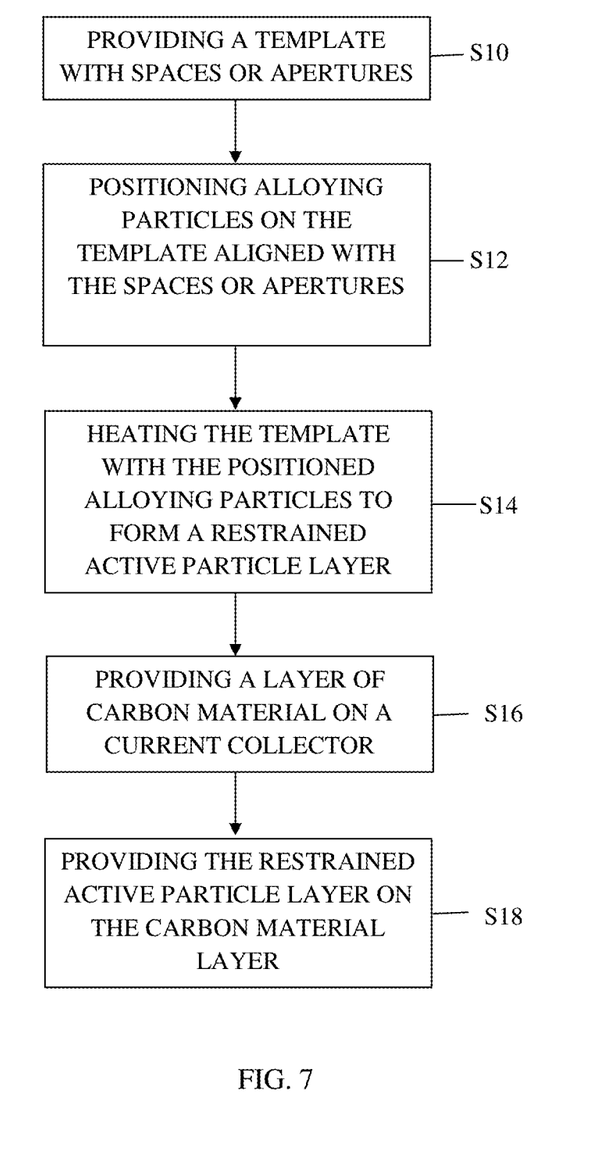
FIG. 7 is a flow diagram of another method of making electrode embodiments disclosed herein.

Another such method, as shown in FIG. 7, when the restricting media 16 is a mesh as illustrated in FIG. 3B or has apertures 32 as illustrated in FIG. 3C, comprises providing a restricting media 16 having a planar main body 18 with spaces 28 or apertures 32 within the planar main body 18 in step S10. Active alloying particles 22 are positioned along the restricting media 16 and aligned with the spaces 28 or apertures 32 in step S12.

Step S12 can be achieved by coating the restricting media 16 with the active alloying particles 22 and a binder. The restricting media 16 and the active alloying particles 22 are heated to create a restrained active particle layer 24 in step S14.

The method can include forming a layer of carbon material 26 on the current collector 12 in step S16 and placing the restrained active particle layer 24 on the layer of carbon material 24 in step S16. The method can further include forming another layer of carbon material 26 on the restrained active particle layer 24, preparing another restrained active particle layer 24, and placing the another restrained active particle layer 24 on the another layer of carbon 26, as illustrated in FIG. 2.

Figure 8:
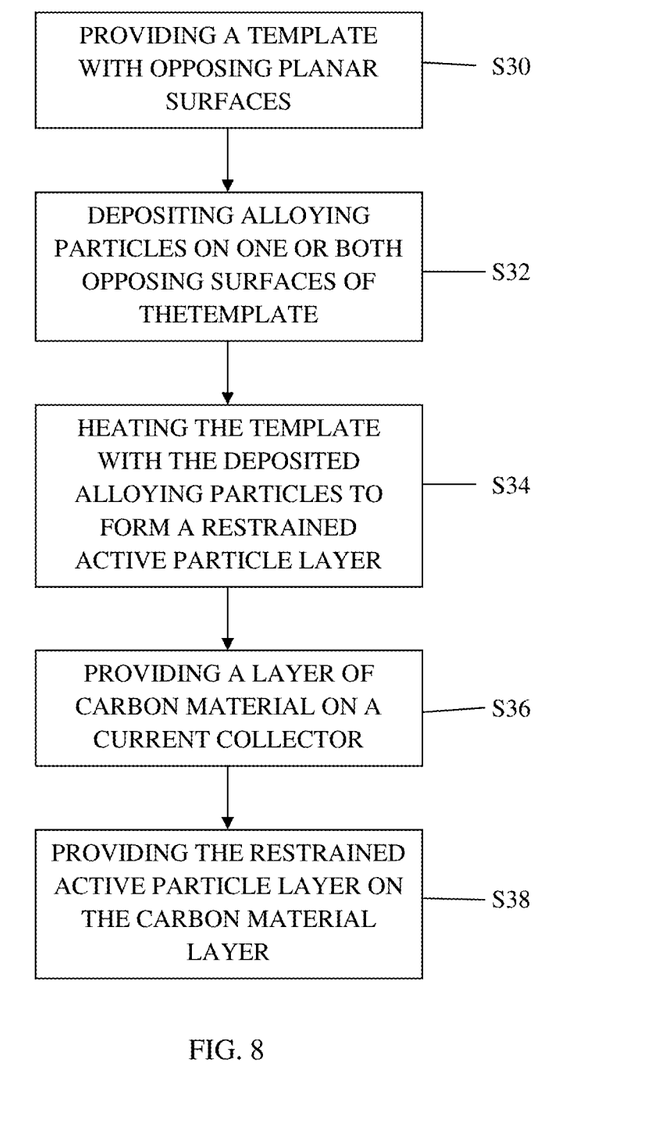
FIG. 8 is a flow diagram of another method of making electrode embodiments disclosed herein.

When the restricting media 16 is a plate as illustrated in FIG. 3A, the method comprises providing a restricting media having a main body with opposing planar surfaces in step S30, illustrated in FIG. 8. Alloying particles 22 are deposited on the opposing planar surfaces 20 to form the restrained active particle layer 24 in step S32. As a non-limiting example, the alloying particles 22 can comprise silicon and depositing the alloying particles 22 can comprise growth of silicon by sublimation-recrystallization. Alternatively, the alloying particles 22 can be deposited using chemical vapor deposition using silane as a precursor.

The restricting media 16 and the active alloying particles 22 are heated to create a restrained active particle layer 24 in step S34. As with the first method, this embodiment can include forming a layer of carbon material 26 on the current collector 12 in step 36 and the restrained active particle layer 24 can be formed on the layer of carbon material 24 in step S38. The method can further include forming another layer of carbon material 26 on the restrained active particle layer 24, preparing another restrained active particle layer 24, and placing the another restrained active particle layer 24 on the another layer of carbon 26, as illustrated in FIG. 2.

As described herein, the methods and systems include a series of steps. Unless otherwise indicated, the steps described may be processed in different orders, including in parallel. Moreover, steps other than those described may be included in certain implementations, or described steps may be omitted or combined, and not depart from the teachings herein. The use of the term "collecting" is not meant to be limiting and encompasses both actively collecting and receiving data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A or B, X can include A alone, X can include B alone or X can include both A and B. In addition, the articles "a" and "an" as used in this application and the appended claims should generally be construed to mean "one or more" unless specified otherwise or clear from context to be directed to a singular form.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

Other embodiments or implementations may be within the scope of the following claims.

What is claimed is:

1. An electrode for a lithium ion battery, comprising:
a current collector;
an electrode material layer adjacent the current collector comprising:
a restricting media having a main body with opposing planar surfaces;
alloying particles deposited on the restricting media to form a restrained active particle layer, the restricting media configured to restrain expansion of the alloying particles during lithiation; and
a carbon material in contact with the alloying particles, wherein the opposing planar surfaces have apertures therethrough, the aperture diameter being 105% to 110% the diameter of the alloying particles, the alloying particles deposited in the apertures with a binder material such that a perimeter of each aperture forms a belt around one or more of the alloying particles, preventing isotropic expansion of the alloying particles while allowing directional expansion of the alloying particles along a stacking direction of the electrode.

2. The electrode of claim 1, wherein a thickness of the restricting media is 25% to 60% of the diameter of the active alloying particles.

3. The electrode of claim 1, wherein the restricting media is a mesh formed from a transitional metal and having apertures of uniform diameter.

4. The electrode of claim 1, wherein the alloying particles comprise silicon and the material of the restricting media has a higher hardness than the alloying particles.

5. The electrode of claim 1, wherein the alloying particles have a range of size distribution, and the apertures of the restricting media are formed in varying diameters to accommodate the range of size distribution of the alloying particles.

6. An electrode for a lithium ion battery comprising:
a current collector; and
an electrode material layer adjacent the current collector comprising:
 a restricting media having a main body with opposing planar surfaces and having apertures therein;
 alloying particles deposited on the restricting media to form a restrained active particle layer, the restricting media configured to restrain expansion of the alloying particles during lithiation; and
 a carbon material in contact with the alloying particles, wherein the alloying particles are deposited in the apertures with a binder material, preventing isotropic expansion of the alloying particles while allowing directional expansion of the alloying particles along a stacking direction of the electrode.

7. The electrode of claim 6, wherein a thickness of the restricting media is 25% to 60% of the diameter of the active alloying particles.

8. The electrode of claim 6, wherein the restricting media is a mesh formed from a transitional metal and having apertures of uniform diameter.

9. The electrode of claim 6, wherein the alloying particles comprise silicon and the material of the restricting media has a higher hardness than the alloying particles.

10. The electrode of claim 6, wherein the alloying particles have a range of size distribution, and the apertures of the restricting media are formed in varying diameters to accommodate the range of size distribution of the alloying particles.

* * * * *